United States Patent
Wenzelburger et al.

(10) Patent No.: US 9,421,621 B2
(45) Date of Patent: Aug. 23, 2016

(54) SINGLE-LIP DRILL

(75) Inventors: Juergen Wenzelburger, Metzingen (DE); Juergen Deeg, Metzingen (DE)

(73) Assignee: botek Praezisionsbohrtechnik GmbH, Riederich (DE)

( * ) Notice: Subject to any disclaimer, the term of this patent is extended or adjusted under 35 U.S.C. 154(b) by 193 days.

(21) Appl. No.: 13/883,373

(22) PCT Filed: Nov. 3, 2011

(86) PCT No.: PCT/DE2011/001927
§ 371 (c)(1),
(2), (4) Date: May 28, 2013

(87) PCT Pub. No.: WO2012/083908
PCT Pub. Date: Jun. 28, 2012

(65) Prior Publication Data
US 2013/0309029 A1    Nov. 21, 2013

(30) Foreign Application Priority Data
Nov. 5, 2010  (DE) .......................... 10 2010 050 351

(51) Int. Cl.
*B23B 41/02* (2006.01)
*B23B 51/04* (2006.01)

(52) U.S. Cl.
CPC .................. *B23B 51/04* (2013.01); *B23B 41/02* (2013.01); *B23B 51/0486* (2013.01); *B23B 2222/28* (2013.01); *B23B 2251/406* (2013.01);
(Continued)

(58) Field of Classification Search
CPC ..................... B23B 2251/424; B23B 2251/56; Y10T 408/5583

USPC .......................................... 408/227, 229, 705
See application file for complete search history.

(56) References Cited

U.S. PATENT DOCUMENTS 2,739,496 A  *  3/1956  Fleischer ...................... 408/206
3,076,356 A        2/1963  Simich
(Continued)

FOREIGN PATENT DOCUMENTS

CH    475 058      7/1969
DE    79 22 246    11/1979
(Continued)

OTHER PUBLICATIONS

International Search Report of PCT/DE2011/001927, date of mailing Jun. 12, 2012.
(Continued)

*Primary Examiner* — Eric A Gates
*Assistant Examiner* — Paul M Janeski
(74) *Attorney, Agent, or Firm* — Collard & Roe, P.C.

(57) ABSTRACT

The invention relates to a single-lip drill (10) having at least one cutting edge (160) for solid drilling, comprising a drill head (13) arranged on a shaft (12), a chip removal channel (151) extending substantially along the axis of the drill head (13) and of the shaft (12) and arranged in both the drill head (13) and the shaft (12), and a plurality of guiding elements (170, 171, 172, 173) arranged on the circumference of the drill head (13), wherein the single-lip drill is characterized in that at least one guiding element (170) is arranged at least partially in an angle range of greater than or equal to 245°, measured from the cutting edge (160) arranged at 0° in a direction opposite the rotational direction of the single-lip drill.

21 Claims, 5 Drawing Sheets

(52) U.S. Cl.
CPC ....... *B23B2251/424* (2013.01); *B23B 2251/56* (2013.01); *Y10T 408/5583* (2015.01)

(56) References Cited

U.S. PATENT DOCUMENTS

| | | | |
|---|---|---|---|
| 3,400,617 A | | 9/1968 | Sanborn |
| 3,422,706 A | * | 1/1969 | Lunsford ................ 408/59 |
| 5,967,707 A | | 10/1999 | Larson |
| 6,637,989 B1 | * | 10/2003 | Moore ............... B23B 51/00 408/119 |
| 7,195,428 B2 | | 3/2007 | Astakhov et al. |
| 2006/0039766 A1 | | 2/2006 | Hecht |
| 2011/0033255 A1 | | 2/2011 | Nomura |

FOREIGN PATENT DOCUMENTS

| | | |
|---|---|---|
| DE | 43 38 545 | 3/1994 |
| DE | 10 2005 025 364 | 12/2006 |
| DE | 20 2009 012 569 | 2/2010 |
| EP | 1 428 601 | 6/2004 |
| EP | 2 236 231 | 10/2010 |
| JP | 06170640 A * | 6/1994 |
| JP | 09103918 A * | 4/1997 |
| JP | 63-102813 | 5/1998 |
| WO | WO 2008/096603 | 8/2008 |

OTHER PUBLICATIONS

International Preliminary Report on Patentability of PCT/DE2011/001927, May 16, 2013.

VDI 3210, Part 1, Deep-hole drilling, VDI-Gesellschaft Produktionstechnik (ADB), VDI-Handbuch Betriebstechnik, Teil 2, 2006, pp. 1-6, 14.

VDI 3208, Guidelines for gun drilling, Richtwerte für das Tiefbohren mit . . . , VDI-Gesellschaft Produktionstechnik (ADB), VDI-Handbuch Betriebstechnik, Teil 2, 1996, pp. 1-16.

* cited by examiner

Section A-A

Section B-B

Section C-C

Section D-D

SINGLE-LIP DRILL

CROSS REFERENCE TO RELATED APPLICATIONS

This application is the National Stage of PCT/DE2011/001927 filed on Nov. 3, 2011, which claims priority under 35 U.S.C. §119 of German Application No. 10 2010 050 351.7 filed on Nov. 5, 2010, the disclosure of which is incorporated by reference. The international application under PCT article 21(2) was not published in English.

The invention relates to a single-lip drill.

DESCRIPTION OF THE PRIOR ART

Such a single-lip drill is disclosed for example in DE 79 22 246 U1.

Single-lip drills are used for introducing boreholes into workpieces. Various types of single-lip drills are shown in the VDI guidelines VDI 3210 and VDI 3208. Single-lip drills are mainly used for producing boreholes of comparatively small diameters which are predominantly in the range of 0.5 mm to 50 mm, wherein the drilling depth can be a multiple of the drilling diameter. Usual values for the drilling depth lie in the range of 10 times to 100 times the drilling diameter, but can also be in excess of or less than this value.

Single-lip drills are used as solid drilling tools or boring tools. Solid drilling tools are used for introducing boreholes into solid material. The entire circular cross-section of the borehole will be machined by the drilling tool during drilling from the solid. Boring tools are used for enlarging the diameter of a borehole already present in a workpiece. The already existing "borehole" or opening can be produced by drilling, casting or in any other manner and is smaller in its diameter than the borehole to be produced by the drilling tool. An annular cross-section will be machined during the enlargement of the borehole.

Single-lip drills generally consist of a drill head and a drill shaft (also often referred to as shaft) and comprise a chucking end. At least one cutting edge is arranged on the drill head, which in the case of a solid drilling tool extends from the central axis of the drill to the circumference of the drill.

Furthermore, guide elements are usually arranged on the circumference of the drill head. Moreover, at least one channel is provided which extends in the drill shaft and in the drilling head and which comprises openings on the drill head and on the chucking end. Coolant will be supplied under pressure through this channel starting from the chucking end, which coolant will exit at the drill head and is provided with the task, in addition to cooling the cutting edge and the guide elements, to flush the chips produced during the drilling through a chip removal channel which is provided in the drill head and in the drill shaft and is mostly arranged in a substantially V-shaped way. The groove is also known as the chip space and usually encloses an angle of approx. 90° to 120°.

A single-lip drill is known from JP 63-102813A, in which an arc-shaped groove is arranged in the region of the drill head in a wall of a V-shaped groove for discharging the chips and which extends in the direction of the drill axis.

Such single-lip drills are usually accommodated on the machine side at their chucking end in a receiver in a spindle provided for this purpose, and are made to rotate by the spindle about the central axis of the drill. At the same time, the tool will be moved towards the workpiece along a central axis with a defined feed per rotation. The single-lip drill will penetrate the workpiece, with the material of the workpiece being cut on the cutting edge arranged on the drill head and will be severed from the workpiece in form of chips. The chips produced in this process will be flushed out of the borehole along the chip removal groove by the coolant which is supplied through the at least one interior channel via the spindle.

It is further also possible to allow the workpiece to perform the rotation and/or the feeding movement, or to perform the rotation and/or the feeding movement partly by the tool and partly by the workpiece.

Furthermore, an oscillating lifting movement of the tool and/or the workpiece can be provided, which movement is possible by means of a drilling apparatus known from DE 10 2005 025 364 A1.

Single-lip drills are preferably used for the purpose of introducing boreholes into workpieces which cannot be produced with other production methods or cannot be produced economically. These workpieces are often produced in large series. Improvements which lead to an increase in the production speed are therefore generally desirable and even small improvements lead to significant savings in the production costs.

The production speed is defined in drilling tools by the product of feed per rotation of the tool and the number of the rotations per minute and is generally known as the feeding speed.

It is now the object of deep drilling technology to produce deep drilling tools which enable precise boreholes with a low deviation of hole straightness in the most cost-effective manner.

The hole straightness deviation is a measuring quantity that characterizes the quality of boreholes. The hole straightness deviation is the deviation of the borehole outlet in relation to the borehole inlet transversely to the ideal axis of the borehole. Such boreholes can usually not be produced with known single-lip drills in one work step. For this reason, it was necessary up until now to pre-drill the workpieces at first with a solid drilling tool. In this first step, the desired hole straightness is not yet achieved. In a second work step, the workpieces will be re-bored with a boring tool. In this second boring work step, it is possible to achieve the desired hole straightness. It is problematic in this respect that two work steps are necessary, i.e. pre-drilling with the help of a solid drilling tool and subsequent re-boring with the help of a boring tool.

SUMMARY OF THE INVENTION

The invention is therefore based on the object of further developing a single-lip drill in such a way that a borehole of high-quality with an especially low hole straightness deviation is possible in a single work step.

This object is achieved by the features described herein.

With the help of the single-lip drill in accordance with the invention, in which at least one part of the at least one guide element is arranged in such a way that predeterminable angular ranges of greater than 245°—as measured from the cutting edge against the direction of rotation of the drill—are covered by the guide element, it is possible to produce boreholes in a single work step by drilling from the solid whose hole straightness deviation is substantially smaller than the hole straightness deviation of the single-lip drills as known from the state of the art. As a result, a second work step for achieving the desired hole straightness can be omitted. It was determined in extensive tests that the hole straightness deviation of boreholes which were produced with the tool in accordance with the invention is under equal test conditions on average only 50% of the hole straightness deviation of boreholes which were produced with conventional single-lip drills as known from the state of the art.

An important feature of the single-lip drill in accordance with the invention is the substantially improved guidance of the single-lip drill in the borehole. It is achieved in such a way that at least one (additional) guide element is arranged in an angular range of greater than 245°, measured from the cutting edge arranged at 0° in a direction opposite the rotational direction of the single-lip drill. When reference is made below to an angle or angular range, it shall apply generally that this angle shall be measured from the cutting edge against the direction of rotation of the drill.

As a result of this configuration, the single-lip drill in accordance with the invention offers support on both sides over a large angular range and therefore especially good guidance in the borehole.

Further advantages and features of the invention are the subject matter of the dependent claims. It can be provided for example that the at least one guide element is arranged in a range of 270°, measured from the cutting edge in a direction opposite the rotational direction of the drill. "In an angular range of 270°" shall mean that the guide element is configured and arranged in such a way that an angle which starts for example at 260° and reaches beyond 270° (e.g. up to 275° or 280°) will be covered. Furthermore, it can be provided for example that the angular range greater than 270° extends from 270° to 280°, especially 270° to 275°, and that the angular range of less than 270° extends from 260° to 270°, especially from 265° to 270°.

It is a further, very relevant feature of the single-lip drill in accordance with the invention that the outer surface of the at least one guide element which faces the borehole has a slightly smaller radial distance from the central axis of the tool in an angular range of greater than 245° than the outer surface of the guide element in an angular range of less than 245° or the outer surfaces of further guide elements which face the borehole. One or several guide elements can be provided in the range of greater than 245°, which guide elements have a radial distance from the central tool axis which is smaller than the radial distance from the central tool axis of the guide elements) which is/are arranged in an angular range of less than 245°. This achieves optimal guidance of the deep-hole drill in the borehole without giving rise to the likelihood that the drill will get stuck in the borehole. These guide elements have a radial distance from the central tool axis which is smaller by up to 50 µm, especially up to 20 µm, than the distance of the outer surface of the guide elements in an angular range of less than 245°.

The drill head of the single-lip drill advantageously tapers towards its chucking end. Jamming of the drill in the borehole is also prevented by this configuration.

It can be provided according to an advantageous embodiment that a first part of the drill head is arranged conically and a second part of the drill head adjacent thereto is arranged cylindrically.

In order to enable the best possible removal of chips, at least one wall of the chip removal channel is preferably curved. A larger opening cross-section than in the case of a non-curved flat wall is achieved especially in the region of the drill head as a result of the curved configuration of the at least one wall of the chip removal channel in order to achieve optimal chip removal despite the smaller opening angle. The term curved shall not only mean a continuous curvature in the present case, but a facet-like curvature for example, i.e. a series of flat areas which are arranged at an angle with respect to each other or a series of curved areas which are arranged at an angle with respect to each other. The curvature of the at least one wall is arranged in such a way that the largest possible cross-section of the chip removal is produced in order to ensure the best possible chip removal.

The walls delimiting the chip removal channel enclose an opening angle in the region of the drill head which is less than 115°. The opening angle is less than 90° according to an advantageous embodiment.

In the region of the shaft, the walls which delimit the chip removal channel have an opening angle which can be larger than 90° in order to enable the use of known conventional shafts.

However, it can also be provided that both the drill head and also the shaft enclose an opening angle which is smaller than 90°. In order to enable the removal of the chips in an operationally reliable manner through this chip space which is smaller in comparison with known solid drilling tools, a cutting edge geometry can further be used which is provided for the use of a drilling apparatus with oscillation. As a result of this cutting edge geometry in conjunction with the drilling apparatus with oscillation, the chip volume will be reduced substantially and the chips can be removed in an operationally reliable manner even through a chip space with an opening angle of less than 90°. The cutting edge geometry is advantageously arranged in such a way as described in DE 20 2009 012 569 U1, to which reference is made in full in this respect. The cutting edge therefore comprises a chip divider which divides the cutting edge into an inner cutting edge region and at least one outer cutting edge region, with the at least one outer cutting edge region having an outwardly curved contour.

In accordance with an advantageous embodiment, the drilling head is materially connected to the shaft. The drilling head and the shaft can also be provided with an integral arrangement. Furthermore, an exchangeable drilling head can be provided.

In accordance with one embodiment, the shaft is made of a profile tube. The shaft can be made of steel and/or hard metal.

Further embodiments relate to the drilling head, which can be made of hard metal and/or can be provided with a coating, e.g. a hard-material coating. The operational lifespan of the single-lip drill can be extended substantially by these measures.

It can further be provided that the drilling head consists of a carrier on which cutting edges and/or guide elements made of a wear-proof material, especially hard metal, are arranged. It can be provided that the cutting edges and/or the guide elements are exchangeable.

As already mentioned above, the cutting edge preferably comprises a chip divider which subdivides the cutting edge into an inner and at least one outer cutting edge area, with the at least one outer cutting edge area having an outwardly curved contour.

Further advantageous developments and embodiments of the single-lip drill in accordance with the invention are the subject matter of the following description.

BRIEF DESCRIPTION OF THE DRAWINGS

Embodiments of the invention are shown in the drawings and will be explained in the description below in closer detail, wherein:

FIG. 1b shows a side view of the single-lip drill as shown in FIG. 1a;

FIG. 2b shows a side view of the single-lip drill as shown in FIG. 2a;

FIG. 3b shows a side view of the single-lip drill as shown in FIG. 3a;

DETAILED DESCRIPTION OF THE PREFERRED EMBODIMENTS

Figure 1A:
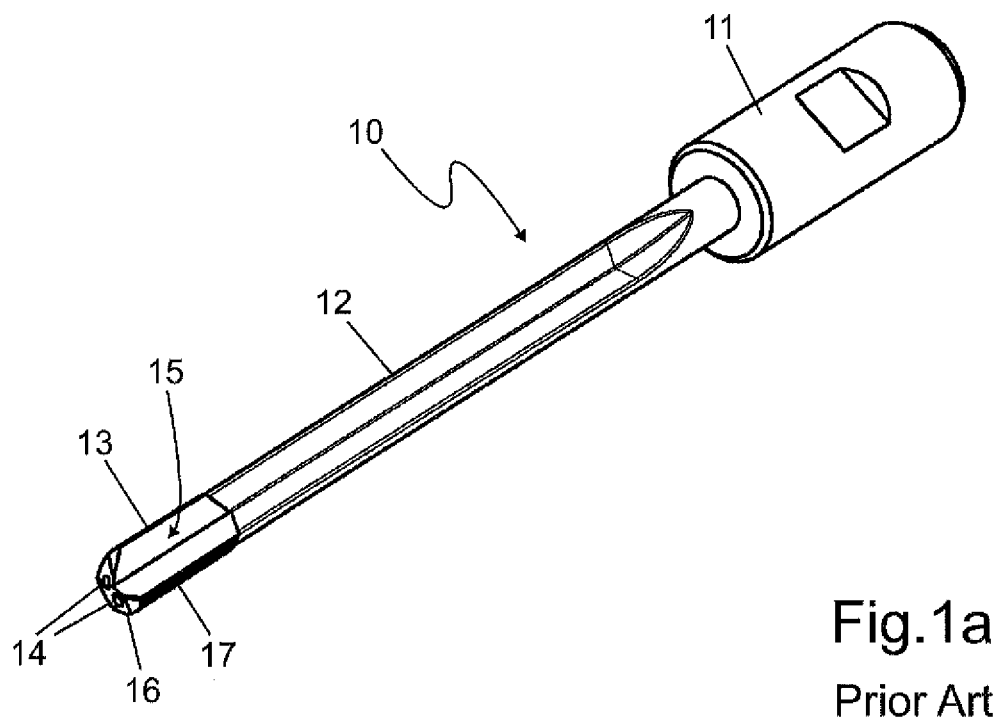
FIG. 1a shows an isometric view of a single-lip drill for drilling from the solid as known from the state of the art.
Figure 1B:
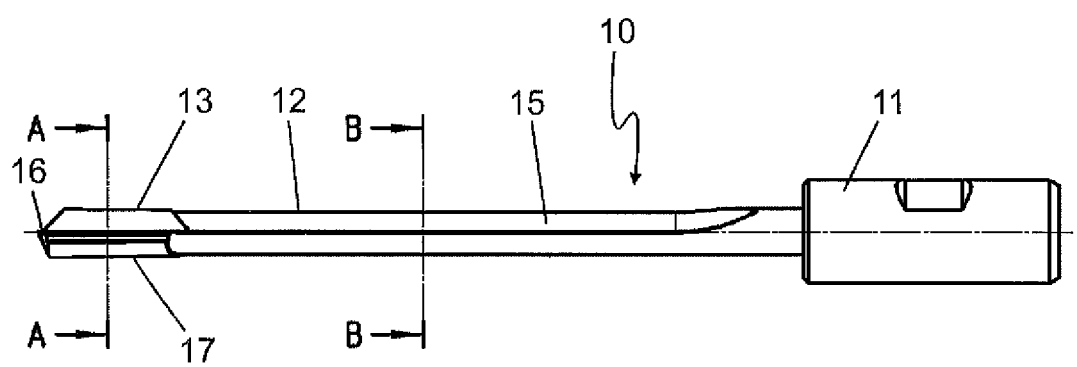

FIGS. 1a and 1b show a single-lip drill 10 with a cutting edge 14, as known from the state of the art. The single-lip drill 10 comprises a chucking end 11 for accommodation in a drill chuck (not shown in FIGS. 1a and 1b in closer detail) and a drill shaft 12 with a drill head 13. The drill shaft 12 and the drill head 13 are realized in an integral configuration for example or are materially joined from two parts. At least one coolant channel 14 is provided in the drill shaft 12, which channel opens into the front end of the drill head 13. The coolant which is pumped through the coolant channel 14 is used not only for cooling the drill head 13, but also for removing the chips produced during drilling through a chip removal groove 15 which starts at the cutting edge 16 of the single-lip drill 10 and extends virtually over the entire length of the drill shaft 12. At least one guide element 17, but preferably several thereof, can be provided on the circumference of the drill head 13, which guide elements are used for guiding the tool.

Figure 4A:
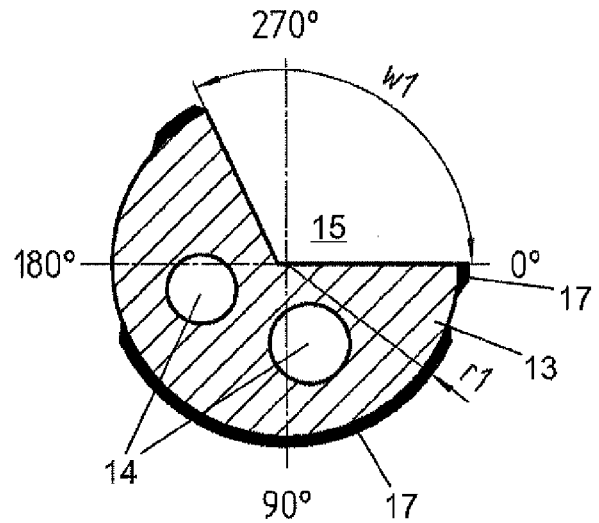
FIG. 4a shows a cross-section through the drilling head of the single-lip drill as shown in FIG. 1b along the line A-A.
Figure 4B:
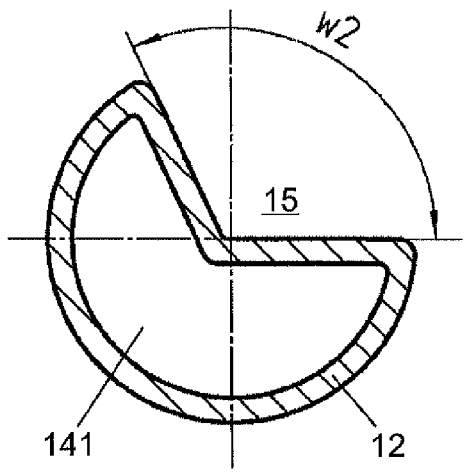
FIG. 4b shows a cross-section through the single-lip drills shown in FIGS. 1b, 2b and 3b along the line B-B.
Figure 5A:
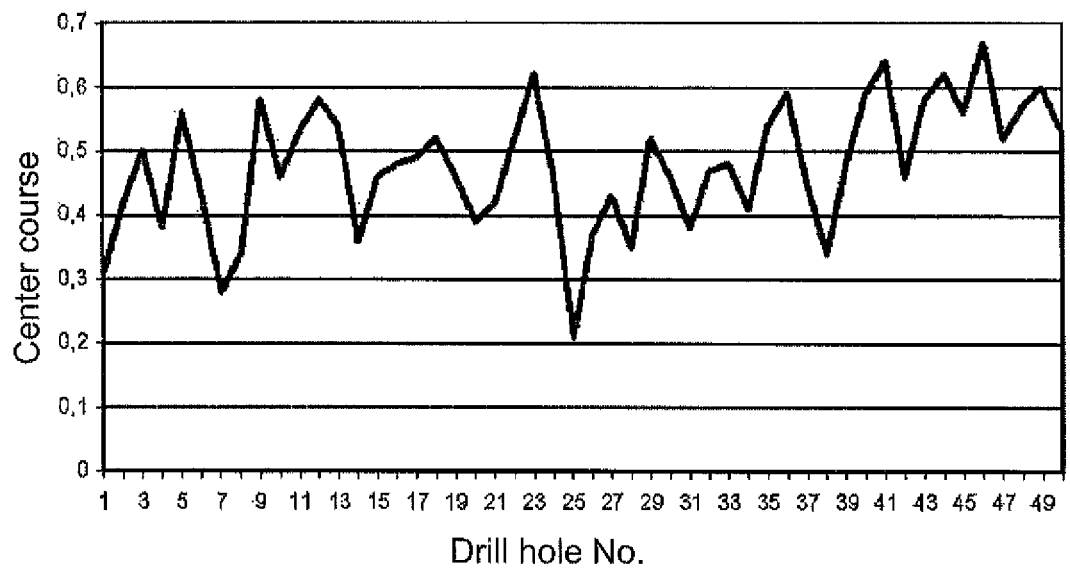
FIG. 5a schematically shows the hole straightness of a borehole produced with a single-lip drill known from the state of the art.

FIG. 4a shows a sectional view along the line A-A shown in FIG. 1b through the drill head 13 and FIG. 4b shows a sectional view along the line B-B shown in FIG. 1b through the drill shaft, which is also referred to herein as shaft 12. These sectional views show a cross-section of the chip removal groove. The chip removal groove 15 has a substantially V-shaped contour and its flat walls enclose an opening angle w1 of approximately 115°. The opening angle w2 in the region of the shaft 12 can deviate from the opening angle w1 in the region of the drill head 13. The shaft can be provided with a hollow configuration, with the hollow space 141 being flow-connected with the coolant channels 14. Such a single-lip drill leads to a hole straightness deviation during drilling from the solid as schematically shown in FIG. 5a. The hole straightness deviation is designated as a measuring quantity which characterizes the quality of boreholes. The hole straightness deviation is the deviation of the borehole outlet in relation to the borehole inlet transversely to the ideal axis of the borehole. As is shown in FIG. 5a, the hole straightness fluctuates to a relatively high extent in the borehole as shown there, which has a diameter of 7.5 mm and a length of 510 mm and which was produced with a single-lip drill as known from the state of the art and as shown in FIGS. 1a, 1b. Its average lies at values of approximately 0.4 to 0.5 mm.

Precise deep drill boreholes of substantially cylindrical shape are desired in industrial production, wherein the borehole is to extend along the cylinder axis and the wall thickness is to be especially uniform after completion of the drilling. The borehole should further be realized in a cost-effective way. In order to achieve a wall thickness that is as uniform as possible, boreholes with an especially low hole straightness deviation are required. Such boreholes cannot be achieved in one work step with the single-lip drills which are shown in FIG. 1a and FIG. 1b and which are known from the state of the art, because the hole straightness deviation could become too large, as shown in FIG. 5a. For this reason, boreholes must be produced in two work steps. The workpiece will be predrilled with a solid drilling tool at first. The desired hole straightness will not be achieved in this process (cf. FIG. 5a). The workpieces will then be re-bored with a boring tool in a second work step. The desired hole straightness can then be achieved with this work step. Two such work steps for the production of a borehole are time-consuming and costly, and therefore undesirable in industrial production.

For this reason, the invention provides to arrange in a single-lip drill at least one guide element at least partly in a region in such a way that predeterminable angular ranges of less than and greater than 270°, as measured against the rotational direction from the cutting edge, will be covered. Preferably, more than one guide element will be arranged, wherein at least one of these guide elements will be arranged in the aforementioned angular ranges of less than and greater than 270°, so that guidance in the angular range of 270° will be realized. If reference is made below to angles or angular ranges with respect to the arrangement of the guide elements, then this shall always mean an angle against the direction of rotation of the single-lip drill as measured from the cutting edge.

Figure 2A:
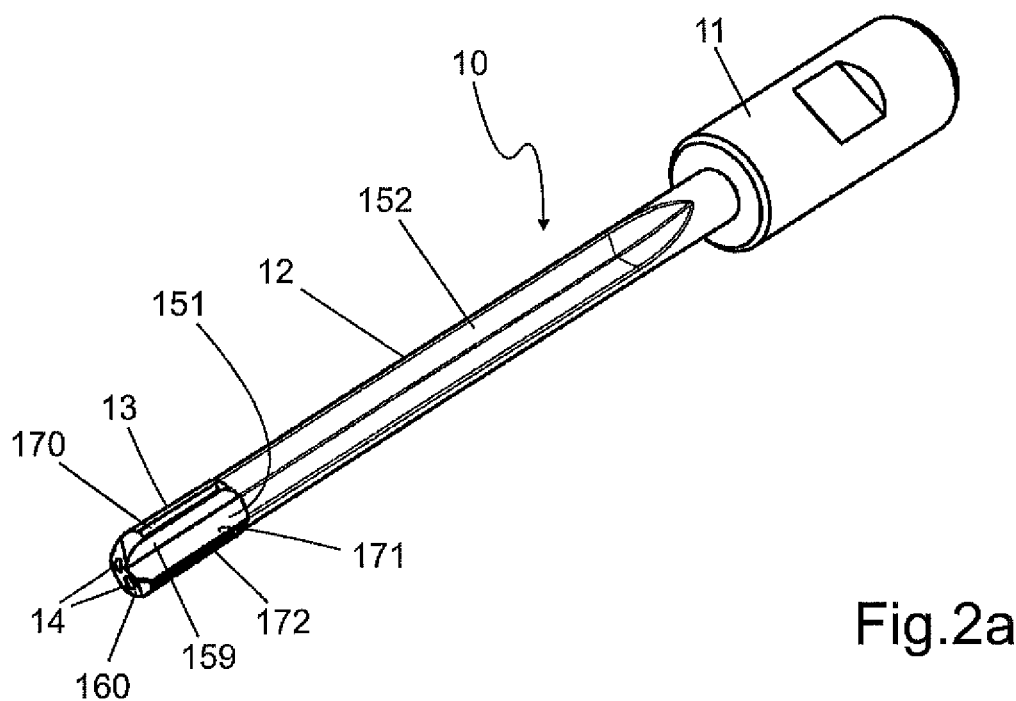
FIG. 2a shows an isometric view of a single-lip drill in accordance with the invention for drilling from the solid.
Figure 2B:
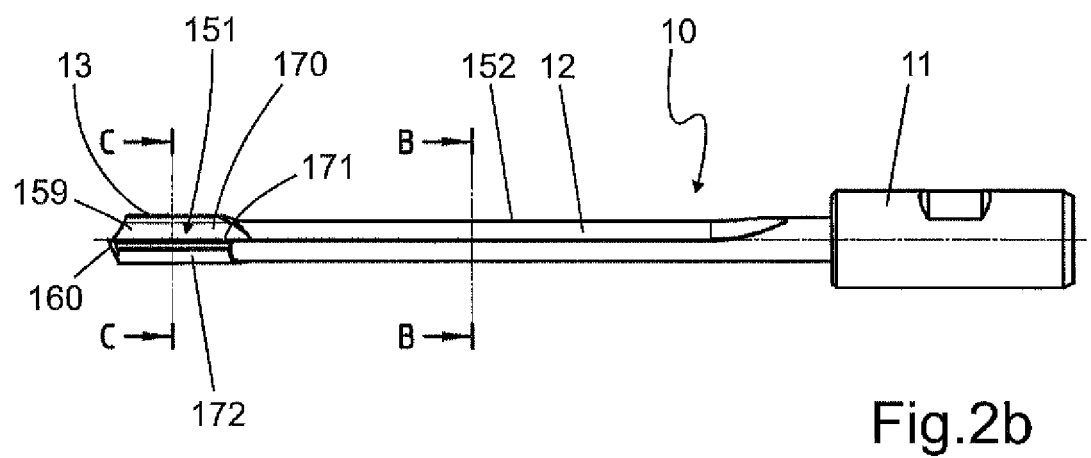
Figure 4C:
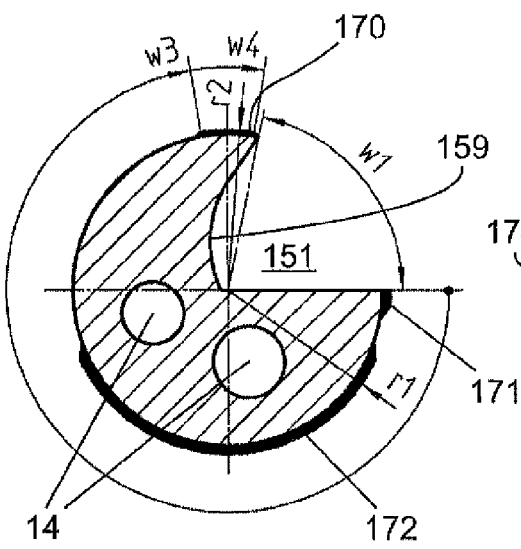
FIG. 4c shows a cross-section through the single-lip drills shown in FIGS. 2b and 3b along the line C-C.
Figure 4D:
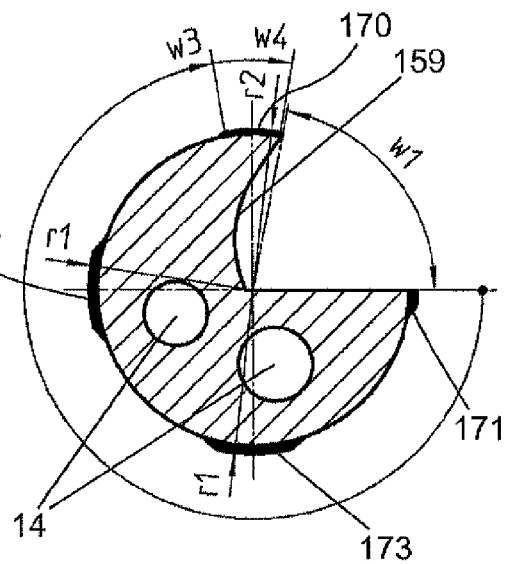
FIG. 4d shows a cross-section through the single-lip drill shown in FIG. 3b along the line D-D.

A first embodiment of such a drill in accordance with the invention is shown in FIGS. 2a and 2b. In FIGS. 2a and 2b, the same elements are provided with the same reference numerals as in FIGS. 1a and 1b, so that reference is made to the statements made above concerning their description. In contrast to the single-lip drill as shown in FIGS. 1a and 1b, a guide element 170 is arranged in the single-lip drill in the region of the drill head as shown in FIGS. 2a and 2b in an angular range as measured from the cutting edge of approximately 260° to 280°, preferably 265° to 275°, and especially 270°. The opening angle w1 consequently decreases to less than 90°. The chip removal groove 151 therefore has an opening angle of less than 90°. In order to nevertheless ensure optimal removal of chips it is provided to arrange at least one wall of the chip removal groove 151, e.g. wall 159, in an arc-shaped curved way, as schematically shown in the sectional view of FIG. 4c. Curved shall mean within the terms of the present invention that the wall is either continuously curved as shown in FIGS. 4c and 4d, or that the wall is arranged in a facetted manner, which is not shown in the drawings. Arranged in a facetted manner shall mean that planar wall segments are provided which are arranged at angle with respect to each other and which form a curved surface. The segments need not comprise flat surfaces but can be arranged in a curved manner themselves. In any case, the curvature is intended to achieve an enlargement of the cross-section of the chip removal groove. As is also shown in FIG. 4c, further guide elements 171, 172 are arranged in the region of the drill head adjacent to the guide element 170.

Figure 3A:
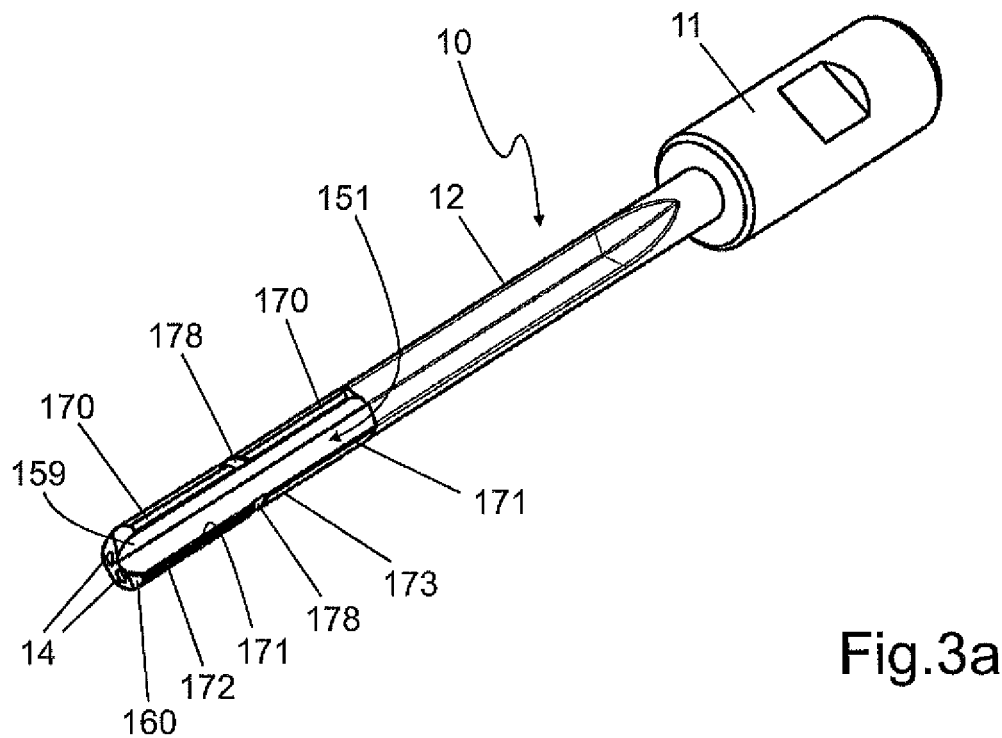
FIG. 3a shows an isometric view of another embodiment of a single-lip drill in accordance with the invention for drilling from the solid.
Figure 3B:
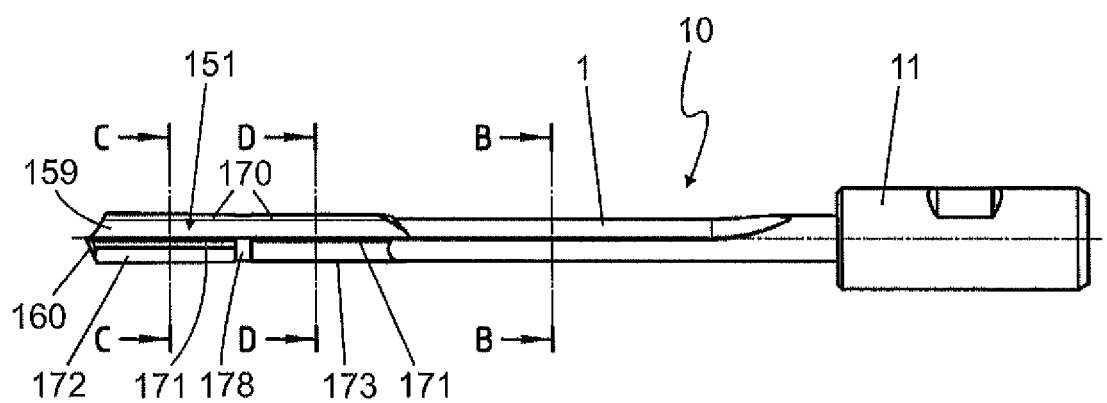

Another embodiment of the single-lip drill in accordance with the invention is shown in FIGS. 3a and 3b. The same reference numerals refer in these drawings to the same elements as in FIGS. 2a and 2b, so that reference is made to the statements above concerning their description. In contrast to the embodiment as shown in FIGS. 2a and 2b, two guide elements 172, 173 are respectively arranged on the drill head along the drill axis, which are separated from one another by a groove 178 in the longitudinal direction of the single-lip drill, said groove extending in the circumferential direction. The groove 178 divides the drill head into two regions, a first conical part and an adjacent cylindrical part which is situated further in the direction of the chucking end 11. This arrangement leads to an especially good guidance in the borehole and simultaneously tight jamming in the borehole is prevented. A guide element is arranged in a range in this embodiment too which extends approximately from 260° to 280°, as measured from the cutting edge arranged at 0°, so that in this case too the opening angle w1 of the chip removal channel 151 is less than 90°. At least one wall of the chip removal channel (e.g. wall 159) is arranged with a curved configuration in this case too in order to ensure the best possible removal of the chips. A sectional view through the portion of the drill head situated further in the direction of the chucking end 11 is the subject matter of FIG. 4d. In addition to the guide element 171, the guide elements 173, 174 are respectively arranged in the range of approximately 90° and 180°, as measured from the cutting edge arranged at 0°. This configuration allows a further improvement in the guidance of the single-lip drill in the borehole.

Other arrangements of guide elements are generally also possible in the single-lip drills as shown in FIGS. 2a, 2b, 3a and 3b. The invention focuses on the guide element which is arranged in the range of approximately 260° to 280°.

The outer surface of the guide element 170, which is arranged in a range of approximately 260° to 280° and especially at 270°, is situated in a smaller radius r2 as measured from the axis of symmetry (central axis) of the drill than the outer surface of the guide elements 171, 172, 173 and 174, which describe a radius r1 as measured from the axis of symmetry of the drill. As a result of this configuration of r2 smaller than r1, tight jamming of the single-lip deep drill in the borehole is prevented in a very effective manner, wherein r2 may only be slightly less than r1 in order to further ensure guidance in the borehole. The radius r2 will be chosen in such a way that it is smaller by up to 50 µm, especially up to 20 µm, than the radius r1.

The single-lip drills which are shown in FIGS. 2a, 2b and also in FIGS. 3a and 3b are preferably arranged in such a way that the drill head 13 tapers towards its chucking end. It can also be provided that a first part of the drill head 13 is arranged in a conical manner and is followed by a second part of the drill head which is arranged in a cylindrical manner. In the drill head as shown in FIGS. 3a, 3b, a first part situated adjacent to the drill tip (shown in FIG. 3a and FIG. 3b on the left) is provided with a conical arrangement and a second region which is divided by the groove 178 and is situated in the direction of the chucking end 11 is provided with a cylindrical arrangement.

The drill head 13 is materially connected to the shaft 12 for example. The drill head 13 and the shaft 12 can also be arranged in an integral manner. It can also be provided that the drill head 13 is detachably fastened to the shaft 12 and is therefore exchangeable. The drill head preferably consists of hard metal. It can be coated at least partly with a hard material layer.

It can also be provided that the drill head consists of a carrier on which the cutting edge 160 or further cutting edges and/or guide elements made of a wear-proof material, especially hard metal, are arranged. The cutting edges and/or the guide elements can be exchangeable.

The shaft 12 preferably consists of a profile tube, by means of which a large opening cross-section for the fluidic channel 141 is provided. The shaft may be made of steel for example, but that is not mandatory. The drill head 13 and the shaft 12 may also consist of one single piece made of hard metal.

Figure 5B:
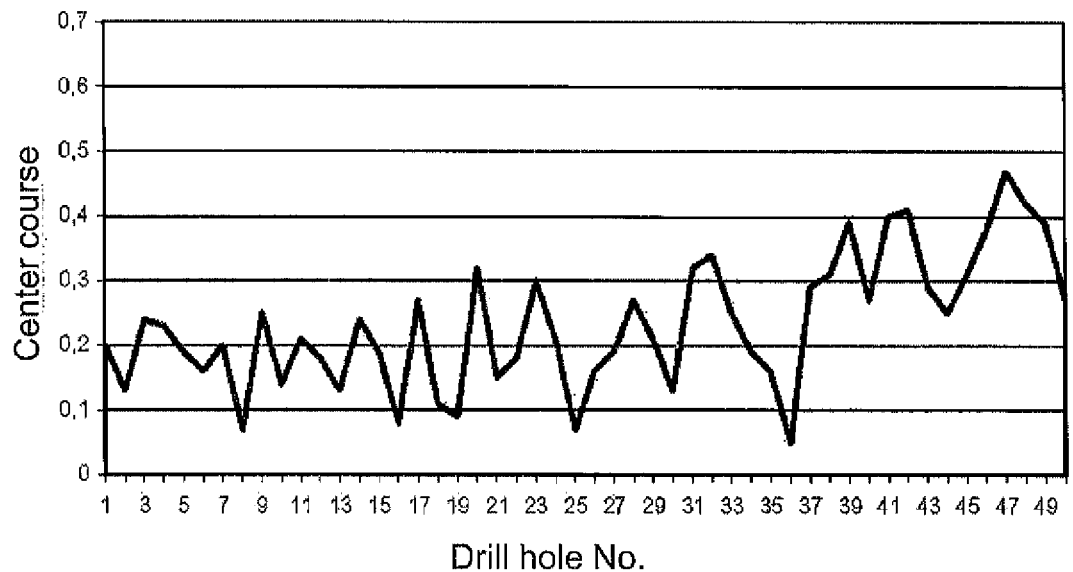
FIG. 5b shows the hole straightness of a borehole produced with a single-lip drill in accordance with the invention.

The drill shown in FIGS. 2a, 2b and 3a, 3b allows substantially better drilling from the solid with a hole straightness deviation shown in FIG. 5b. The hole straightness deviation shows substantially lower values (cf. FIG. 5a) in comparison with a drill as known from the state of the art and shown in FIGS. 1a, 1b. For this reason, the single-lip drills in accordance with the invention (as shown in FIGS. 2a, 2b and 3a, 3b) allow producing boreholes of low hole straightness deviation in one single work step. This will substantially be achieved in such a way that a support of the drill of a large angular range and therefore especially good guidance in the borehole will be achieved by the further guide element 170 which is arranged in the range of 270°.

It needs to be especially mentioned and stressed at this point that the drill in accordance with the invention may comprise a cutting edge 160 which differs from the cutting edge 16 known from the state of the art in such a way that it has a cutting edge geometry which is optimized for use in a drilling apparatus with oscillation as disclosed for example from DE 10 2005 025 364 A1 A cutting edge which is suitable for such a single-lip drill has been disclosed for example in DE 20 2009 012 569 U1, to which reference is made in full in this respect. At least one chip divider is provided in the cutting edge which divides the cutting edge into an inner cutting edge region and at least one outer cutting edge region. The at least one outer cutting edge region has an outwardly curved contour. This upwardly curved contour can be formed for example by planar straight lines but also by an arc of a circle or by a respectively convex curvature.

The single-lip drill in accordance with the invention as described above is preferably arranged as a solid drilling tool. It allows the production of boreholes in one single work step and therefore cost-optimized production of a highly precise borehole.

The invention claimed is:

1. A single-lip drill, comprising
   at least one cutting edge for drilling from the solid, the at least one cutting edge extending from a central axis of the single-lip drill to a circumference of the single-lip drill,
   a drill head arranged on a shaft, and
   a chip removal channel which substantially extends along the axis of the drill head and the shaft and which is arranged both in the drill head and the shaft,
   a first guide element region which is arranged on the circumference of the drill head, is a conical guide element region, and directly follows the at least one cutting edge, and
   a second guide element region arranged on the circumference of the drill, arranged in a cylindrical manner, and situated with respect to the first guide element region further in a direction of a chucking end of the single-lip drill,
   wherein a first guide element is arranged in the first guide element region in such a way that predeterminable angular ranges of greater than 245° against the direction of rotation of the single-lip drill are covered by the first guide element, as measured from the cutting edge arranged at 0°,
   wherein a second guide element is arranged in the first guide element region in an angular range of less than 245°, as measured from the cutting edge arranged at 0°, wherein at least one wall of the chip removal channel is curved, wherein the outer surface of the first guide element which faces the borehole has a first radial distance from the central axis of the single-lip drill, wherein the outer surface of the second guide element which faces the borehole has a second radial distance from the central axis of the single-lip drill, wherein the first radial distance is smaller than the second radial distance, and wherein a third guide element is arranged in the second guide element region in such a way that predeterminable angular ranges of greater than 245° against the direction of rotation of the single-lip drill are covered by the third guide element, as measured from the cutting edge arranged at 0°.

2. A single-lip drill according to claim 1, wherein the angular range extends greater than 260°.

3. A single-lip drill according to claim 1, wherein the predeterminable angular range extends from 265° to 275°.

4. A single-lip drill according to claim 1, wherein the first radial distance is smaller by up to 50 µm, especially up to 20 µm, than the second radial distance.

5. A single-lip drill according to claim 1, wherein the drill head tapers towards its chucking end.

6. A single-lip drill according to claim 1, wherein the walls delimiting the chip removal channel enclose an opening angle in the region of the drill head which is less than 90°.

7. A single-lip drill according to claim 1, wherein the walls delimiting the chip removal channel enclose an opening angle in the region of the drill shaft which is greater than 90°.

8. A single-lip drill according to claim 1, wherein the drill head is materially connected to the shaft.

9. A single-lip drill according to claim 1, wherein the drill head and the shaft are integrally arranged.

10. A single-lip drill according to claim 1, wherein the drill head is exchangeable.

11. A single-lip drill according to claim 1, wherein the drill head consists of hard metal.

12. A single-lip drill according to claim 1, wherein the drill head is coated at least partly with a hard material layer.

13. A single-lip drill according to claim 1, wherein the drill head consists of a carrier on which cutting edges and/or guide elements are arranged which consist of a wear-proof material, especially hard metal.

14. A single-lip drill according to claim 1, wherein the cutting edges and/or the guide elements are exchangeable.

15. A single-lip drill according to claim 1, wherein the shaft is made of a profile tube.

16. A single-lip drill according to claim 1, wherein the shaft consists of steel and/or hard metal.

17. A single-lip drill according to claim 1, wherein the drill head and the shaft consist of a single piece of hard metal.

18. A single-lip drill according to claim 1, wherein its cutting edge comprises a chip divider.

19. A single-lip drill according to claim 1, wherein a fourth guide element and a fifth guide element are arranged in the second guide element region in an angular range of less than 245°, as measured from the cutting edge arranged at 0°.

20. A single-lip drill according to claim 1, wherein a fourth guide element is arranged in the second guide element region in an angular range of less than 245°, as measured from the cutting edge arranged at 0°, and wherein a first arrangement of the first guide element and the second guide element in the first guide element region are different from a second arrangement of the third guide element and the fourth guide element in the second guide element region.

21. A single-lip drill according to claim 1, further comprising a circumferential groove in the drill head, the circumferential groove separating the first guide element region from the second guide element region.

* * * * *